United States Patent
Buergel et al.

(10) Patent No.: US 10,322,970 B2
(45) Date of Patent: Jun. 18, 2019

(54) REACTION RESIN MORTAR CURABLE BY FRONTAL POLYMERIZATION AND METHOD FOR FIXING ANCHOR RODS

(71) Applicant: Hilti Aktiengesellschaft, Schaan (LI)

(72) Inventors: Thomas Buergel, Landsberg am Lech (DE); Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 389 days.

(21) Appl. No.: 15/023,317

(22) PCT Filed: Sep. 19, 2014

(86) PCT No.: PCT/EP2014/069955
§ 371 (c)(1),
(2) Date: Mar. 18, 2016

(87) PCT Pub. No.: WO2015/040143
PCT Pub. Date: Mar. 26, 2015

(65) Prior Publication Data
US 2016/0236983 A1    Aug. 18, 2016

(30) Foreign Application Priority Data
Sep. 19, 2013   (EP) .................................. 13185075

(51) Int. Cl.
*C04B 26/06* (2006.01)
*C04B 26/02* (2006.01)
(Continued)

(52) U.S. Cl.
CPC .............. *C04B 26/06* (2013.01); *C04B 26/02* (2013.01); *C08F 2/38* (2013.01);
(Continued)

(58) Field of Classification Search
CPC ............ C08F 2/38; C04B 26/02; C04B 26/06
See application file for complete search history.

(56) References Cited

U.S. PATENT DOCUMENTS

| 5,232,496 A | 8/1993 | Jennings et al. |
| 5,326,843 A * | 7/1994 | Lorah .................. C08F 212/04 526/318.6 |

(Continued)

FOREIGN PATENT DOCUMENTS

| CA | 2329245 A1 | 7/2001 |
| DE | 39 40 309 A1 | 6/1991 |

(Continued)

OTHER PUBLICATIONS

International Search Report (PCT/ISA/220 & PCT/ISA/210) issued in PCT Application No. PCT/EP2014/069955 dated Jan. 28, 2015 with English translation (eight pages).

(Continued)

*Primary Examiner* — Daniel McNally
(74) *Attorney, Agent, or Firm* — Grüneberg and Myers PLLC

(57) ABSTRACT

A reaction resin mortar curable by frontal polymerization is described, comprising at least one radically polymerizable compound (a), at least one thiol-functionalized compound (b) and at least one polymerization initiator (c), wherein the weight ratio of the at least one radically polymerizable compound (a) and the at least one thiol-functionalized compound (b) is in the range of 10:1 to 2:1 and wherein the polymerization initiator (c) is selected from compounds which can be thermally activated and/or thermally released at a temperature of above 30° C. and/or ammonium persulfates which are formed in-situ from at least one organically substituted ammonium salt and at least one inorganic persulfate as well as a method for fixing anchor rods, rebars or the like in bore holes using the reaction resin mortar.

13 Claims, 1 Drawing Sheet

(51) Int. Cl.
*C08F 2/38* (2006.01)
*C04B 111/00* (2006.01)
*C08K 5/37* (2006.01)
*C04B 103/00* (2006.01)

(52) U.S. Cl.
CPC ............ *C04B 2103/0047* (2013.01); *C04B 2111/00715* (2013.01); *C08K 5/37* (2013.01)

(56) References Cited

U.S. PATENT DOCUMENTS

| | | | |
|---|---|---|---|
| 5,436,396 A | 7/1995 | Bailey et al. | |
| 5,531,546 A | 7/1996 | Herdlicka et al. | |
| 6,541,545 B1 | 4/2003 | Simmons et al. | |
| 2001/0018880 A1* | 9/2001 | Pfeil | C04B 26/02 106/803 |
| 2003/0027900 A1* | 2/2003 | Burgel | C04B 26/06 524/2 |
| 2004/0092656 A1 | 5/2004 | Vogel et al. | |
| 2011/0073327 A1 | 3/2011 | Buergel | |
| 2011/0136942 A1* | 6/2011 | Pfeil | C08G 75/045 524/2 |
| 2012/0302657 A1 | 11/2012 | Moszner et al. | |

FOREIGN PATENT DOCUMENTS

| | | |
|---|---|---|
| DE | 42 31 161 A1 | 3/1994 |
| DE | 43 15 788 A1 | 11/1994 |
| DE | 100 02 367 C1 | 7/2001 |
| DE | 101 32 336 A1 | 1/2003 |
| DE | 10132336 C2 | 7/2003 |
| DE | 102009043792 A1 | 3/2011 |
| EP | 1 118 599 A1 | 7/2001 |
| EP | 1 273 617 A2 | 1/2003 |
| EP | 2 455 059 A1 | 5/2012 |
| JP | 7-509413 A | 10/1995 |
| JP | 2011-137141 A | 7/2011 |
| RU | 2 109 922 C1 | 4/1998 |
| RU | 2 241 831 C2 | 12/2004 |
| RU | 2003131684 A | 1/2005 |
| WO | WO 91/05644 A1 | 5/1991 |

OTHER PUBLICATIONS

German-language Written Opinion (PCT/ISA/237)) issued in PCT Application No. PCT/EP2014/069955 dated Jan. 28, 2015 (seven pages).

Russian-language Office Action issued in counterpart Russian Application No. 2016114884/03 dated Apr. 17, 2018 (five (5) pages).

Russian-language Search Report issued in counterpart Russian Application No. 2016114884/03 dated Apr. 15, 2018 (two (2) pages).

\* cited by examiner

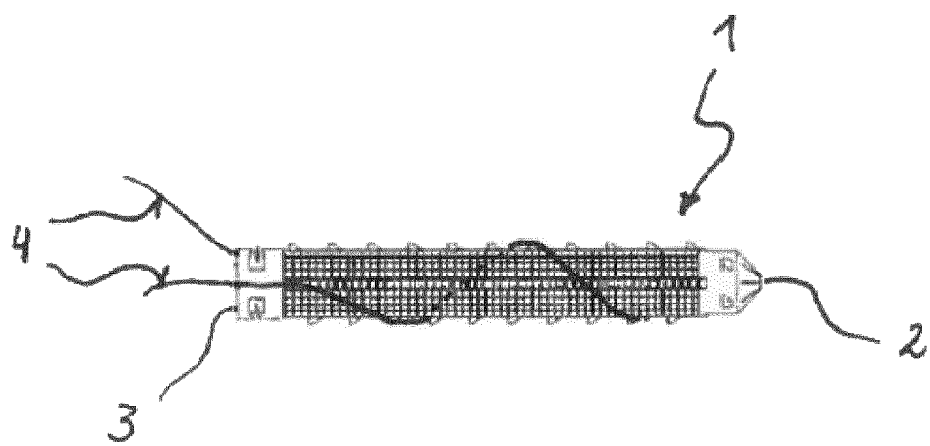

REACTION RESIN MORTAR CURABLE BY FRONTAL POLYMERIZATION AND METHOD FOR FIXING ANCHOR RODS

BACKGROUND OF THE INVENTION

Field of the Invention

The present invention relates to a reaction resin mortar curable by frontal polymerization having at least one radically polymerizable compound, at least one thiol-functionalized compound and at least one polymerization initiator, as well as to a method for fixing anchor rods, rebars or the like in solid supports using this reaction resin mortar.

Two-component reaction resin mortars based on methacrylates or epoxide resins are normally used for fixing anchor rods, rebars or similar elements in a bore hole in mineral subgrades such as concrete or masonry. After the mixing of the constituents reacting with each other, these reaction resin mortars have a certain pot life during which the element to be fixed can be set and reach the final strength thereof after a further period of time has elapsed. The mentioned pot life is in the range of a few minutes under normal conditions. Curing generally takes place within a few minutes to hours. In each case, the two effects are connected to each other, i.e., a longer pot life leads to a longer curing time, and these times may vary depending on the environmental conditions, namely on the temperature.

A reaction resin mortar for fixing anchorings is known from DE 39 40 309 A1 which contains radically curable vinyl ester urethane as binder and delivers fixings with excellent stability and strength.

The subject matter of DE 42 31 161 A1 is a two-component reaction resin mortar for fixing anchoring means in bore holes having a content of curable compounds on inorganic and organic basis and curing agents which has an extraordinarily favorable storability due to the content thereof of hydraulically binding and/or polycondensable compounds and curable vinyl esters, in addition to reduced shrinkage tendency, increased heat distortion resistance, improved fire behavior, resistance to climatic conditions, higher bond strength, favorable expansion coefficients, satisfactory long-term behavior and high thermal shock resistance.

Lastly, DE 43 15 788 A1 discloses plugging resins for fixing anchors into fixed bodies which are present in an ampoule or cartridge and contain, as binders, radically non-polymerizable polymers, reactive diluents having at least two (meth)acrylate groups, other reactive diluents, reactive diluents with a boiling point of 180° C., other polymers and a non-reactive solvent. These plugging resins allow retaining values that are common or required in the prior art, to be achieved; they are safe to handle; they contain fewer toxic components and the physical properties thereof can be adapted to the respective purpose of application.

Since it is seldom possible to work under optimal conditions even using these reaction resin mortars or plugging resins on construction sites, if for example a number of bore holes are first coated with these reaction resin mortars or plugging resins and then fixing elements are introduced after each other, different time periods result between the setting of the curable reaction resin mortar or the plugging resin and the introduction of the fixing elements which can lead to the premature curing of the reaction resin mortar or of the plugging resin such that the bore hole can no longer be used, which is critical, especially in the case of high temperatures (during summer).

In order to overcome the temperature dependence of pot life and/or curing time, the older German patent DE 100 02 367 C1 proposes a reaction resin mortar curable by frontal polymerization after thermal initiation which, in addition to a polymerizable monomer or curable resin and optionally at least one filler, contains a polymerization initiator for the monomer which can be thermally activated and/or thermally released at a temperature of above 30° C. and/or a curing accelerator for the curable resin, with the type and quantity of monomers or resin and polymerization initiator or curing accelerator being selected such that a speed of the polymerization front (front speed) of at least 10 cm/min results after triggering of the polymerization. The inadequate storability is disadvantageous in this system.

In order to increase the storability of this system, but still provide a very reactive system, DE 101 32 336 A1 proposes using an organically substituted ammonium persulfate as the polymerization initiator which is present only in the form of the required raw materials in separate components of the reaction resin mortar and is formed only during the mixing of the at least two components in-situ in the reaction resin mortar. In this regard, one component of the reaction resin mortar contains at least one organically substituted ammonium salt, while another component contains at least one inorganic persulfate which form the organically substituted ammonium persulfate in a very quick reaction, which is then available as the initiator for the radical curing of the reaction resin mortar.

Both the reaction resin mortar according to DE 100 02 367 C1 and that according to DE 101 32 336 A1 have, however, the disadvantage of being extremely reactive systems in which high front temperatures are reached. These high temperatures lead to noticeable smoke development and foaming during curing. Critical gases develop which are attributable to products of decomposition. In addition, relatively strong foaming of the masses during curing is observed with these systems. As a result of this, a solid which is not very compact is obtained which negatively affects the load values such that the application area for these reaction resin mortars is limited.

SUMMARY OF THE INVENTION

The inventors have found that by exchanging the reactive components, in particular the reactive polymerizable compounds for less reactive compounds, the problems could not be overcome. In fact, it was observed that curing was insufficient and the polymerization front frequently collapsed and the curing thus came to a standstill before the reaction resin mortar was fully cured.

The object of the present invention now consists of providing a reaction resin mortar which cures by frontal polymerization after thermal initiation which does not present the disadvantages described above, which in particular exhibits less smoke development and less foaming, fully cures and results in a compact mass after curing of the reaction resin mortar.

It has surprisingly now been shown that this object can be achieved by the addition of thiol-functionalized compounds. It is thus possible to provide a reaction resin mortar which, compared with the systems known from DE 100 02 367 C1 and DE 101 32 336 A1, is less reactive, has less smoke development and reduced foaming, but still fully cures and leads to a compact polymer.

The subject matter of the invention is thus a reaction resin mortar curable by frontal polymerization, comprising at least one radically polymerizable compound (a), at least one thiol-functionalized compound (b) and at least one polymerization initiator (c), wherein the weight ratio of the at least one radically polymerizable compound (a) and the at least one thiol-functionalized compound (b) is in the range of 10:1 to 2:1 and wherein the polymerization initiator (c) is selected from compounds which can be thermally activated and/or thermally released at a temperature of above 30° C. and/or ammonium persulfates which are formed in-situ from at least one organically substituted ammonium salt and at least one inorganic persulfate.

BRIEF DESCRIPTION OF THE DRAWING

The FIGURE illustrates a Hilti HIT-SC 16*85 screen sleeve (1) with an insertion end (2) and an open end (3) and a resistance wire (4).

DETAILED DESCRIPTION OF THE INVENTION

The reaction resin mortar according to the invention only then substantially cures if the thermally-activatable and/or thermally-releasable polymerization initiator becomes active as a result of thermal initiation, i.e. by selective or extensive heating of the surface layer or by heating in the inside of the reaction resin mortar to a temperature of above 30° C., and triggers the polymerization of the curable compound. It becomes possible as a result to reach practically any length of pot life of the mortar and to separate this completely from the curing time, since the curing is started only by the thermal initiation. In this way, it is possible to set and to adjust the element to be fixed possibly even hours after the introduction of the reaction resin mortar into the bore hole and to carry out the curing of the reaction resin mortar within seconds to a few minutes by briefly heating the mortar surface.

In this regard, thermal initiation is understood as the polymerization reaction of the reaction resin mortar being capable of being triggered by the supply of heat at any time point, optionally after the formation thereof by the mixing of the constituents present in separate components, such that a very long pot life of the reaction resin mortar results and the curing thereof can be started at any desired time point. It is possible as a result to initially fill a large number of bore holes with the reaction resin mortar, subsequently introduce the fixing elements, adjust and then initiate the curing such that it is possible to achieve an optimal and largely identical curing and thus largely identical pull-out resistance of the installed fixing elements.

Lastly, with the reaction resin mortar according to the invention it is not only possible to carry out the frontal polymerization downwards following gravity, but also upwards in a horizontal or vertical direction. In this way, by correspondingly setting the viscosity of the reaction resin mortar it is possible to fill bore holes opening downwards, for example even in ceilings, with reaction resin mortar, to introduce fixing elements and to trigger the curing by thermal initiation.

The triggering of the polymerization of the reaction resin mortar in accordance with the invention preferably takes place by selective or extensive heating of the surface layer with the aid of a flame, a soldering tip, a heating wire which extends either over the entire length or a part of the length of the fixing element, a hot air fan, a flash of light/laser beam, an induction oven or the like or in-situ by a chemical reaction or by heat input via a heat-conducting fixing element into the inside of the reaction resin mortar.

Alternatively, by corresponding selection of the constituents of the reaction resin mortar it is possible for the reaction resin mortar according to the invention to also spontaneously cure without thermal activation after a certain waiting time. The inventor has found that in the presence of a polymerization accelerator (d), polymerization of the reaction resin mortar starts even without previous thermal initiation after a certain time which is dependent on the concentration of the polymerization accelerator.

A compound having at least one C—C double bond is expediently used as the radically polymerizable compound (a), which C—C double bond can be radically cured and is sufficiently stable when stored due to the absent homopolymerization.

According to a preferred embodiment of the invention, the compound having at least one reactive C—C double bond is a compound having at least one non-aromatic C—C double bond, such as (meth)acrylate-functionalized compounds, allyl-functionalized compounds, vinyl-functionalized compounds, norbornene-functionalized compounds and unsaturated polyester compounds.

Examples of unsaturated polyester compounds can be found in the article by M. Maik et. al. *J. Macromol. Sci., Rev. Macromol. Chem. Phys.* 2000, C40, 139-165 in which a classification of such compounds was made based on the structure thereof, with five groups being mentioned: (1) orthoresins. (2) isoresins, (3) bisphenol-A fumarates, (4) chlorendics and (5) vinyl ester resins. The so-called dicyclopentadienes (DCPD) resins can also be distinguished therefrom.

More preferably, the compound having reactive carbon multiple bonds has allyl, vinyl, (meth)acryl, fumaric acid, maleic acid, itaconic acid, crotonic acid or cinnamic acid double bond units or the compound having reactive carbon double bonds is a Diels-Alder adduct or a norbornene derivative thereof or a derivative thereof having one other compound which bears bicyclic double bonds. Exemplary compounds are vinyl esters, allyl esters, vinyl ethers, allyl ethers, vinyl amines, allyl amines, vinyl amides, esters and amides of (meth)acrylic acid, esters of fumaric acid and maleimides.

The polymerizable monomers or curable resins used according to the invention are preferably selected from: acrylic acid, methacrylic acid, styrene, divinylbenzene, vinyl acetate, acrylamide, transition metal nitrate/acrylamide complexes; acrylates such as butyl acrylate, 2-(2-ethoxyethoxy)ethyl acrylate (EOEOEA), tetrahydrofurfuryl acrylate (THFA), lauryl acrylate, phenoxyethyl acrylate, isodecyl acrylate, tridecyl acrylate, ethoxylated nonylphenol acrylate, isobornyl acrylate (IBOA), ethoxylated bisphenol A diacrylate, polyethylene glycol diacrylate (PEGDA), alkoxylated diacrylate, propoxylated neopentyl glycol diacrylate (NPGPODA), ethoxylated neopentyl glycol diacrylate (NPGEODA), hexane-1,6-diol diacrylate (HDDA), tetraethylene glycol diacrylate (TTEGDA), triethylene glycol diacrylate (TIEGDA), tripropylene glycol diacrylate (TPGDA), dipropylene glycol diacrylate (DPGDA), ditrimethylolpropane tetraacrylate (DiTMPTTA), tris-(2-hydroxyethyl)isocyanurate triacrylate (THEICTA), dipentaerythritol pentaactylate (DiPEPA), ethoxylated trimethylolpropane triacrylate (TMPEOTA), propoxylated trimethylolpropane triacrylate (TMPPOTA), ethoxylated pentaerythritol tetraacrylate (PPTTA), propoxylated glycerol triacrylate (GPTA), pentaerythritol tetraacrylate (PETTA), trimethylolpropane triacrylate (TMPTA) and modified pentaerythritol triacrylate; methacrylates such as methyl methacrylate (MMA), allyl methacrylate (AMA), tetrahydrofurfuryl methacrylate (THFMA), phenoxyethyl methacrylate, isobornyl methacrylate, triethylene glycol dimethacrylate (TIEGDMA), ethylene glycol dimethacrylate (EGDMA), tetraethylene glycol dimethacrylate (TTEGDMA), polyethylene glycol dimethacrylate (PEGDMA), butanediol dimethacrylate (BDDMA), diethylene glycol dimethacrylate (DEGDMA), hexanediol dimethacrylate (HDDMA), polyethylene glycol dimethacrylate (PEG600DMA), butylene glycol dimethacrylate (BGDMA), ethoxylated bisphenol A dimethacrylate, trimethylolpropane trimethacrylate (TMPTMA); and/or oligomers or prepolymers such as bisphenol A epoxy acrylate, epoxidized soybean oil acrylate, epoxy novolac acrylate oligomers, fatty acid modified bisphenol A epoxy acrylate, aromatic monacrylate oligomer, aliphatic diacrylate oligomer, tetrafunctional epoxy acrylate, amine modified polyether acrylate oligomer, aliphatic urethane triacrylate, aliphatic urethane tetraacrylate, aliphatic urethane diacrylate, hexafunctional aromatic urethane acrylate, aromatic urethane diacrylate, aromatic urethane tetraacrylate and tetrafunctional polyester acrylate.

The polymerizable monomers or curable resins can be used alone or as a mixture.

The reaction resin mortar can, if necessary, contain non-reactive diluents such as lower-alkyl ketones, e.g. acetone, di-lower alkyl-lower alkanoylamides such as dimethylacetamide, lower alkyl benzenes such as xylene or toluene, phthalic acid esters or paraffins or water, in particular a dialkyl phthalate or dialkyl adipate and/or dimethylformamide in a quantity of up to 10 wt %, in particular 5 wt %.

Any compound which has at least two thiol groups can expediently be used as the thiol-functionalized compound (b). Any thiol group is, in this regard, bound either directly or via a linker to a structure, and the thiol-functionalized compound of the present invention can have any wide number of structures.

The structure can be a monomer, an oligomer or a polymer.

In some embodiments of the present invention, the structures have monomers, oligomers or polymers with a molecular weight (mw) of 50,000 g/mol or less, preferably 25,000 g/mol or less, more preferably 10,000 g/mol or less, even more preferably 5,000 g/mol or less, even more preferably 2,000 g/mol or less and most preferably 1,000 g/mol or less.

Alkane dioles, alkylene glycols, sugar, polyvalent derivatives thereof or mixtures thereof and amines such as ethylenediamine and hexamethylenediamine and thiols may be mentioned as monomers which are suitable as structures. The following can be mentioned, by way of example, as oligomers or polymers which are suitable as structures:

polyalkyleneoxide, polyurethane, polyethylene vinyl acetate, polyvinyl alcohol, polydiene, hydrated polydiene, alkyd, alkyd polyester, (meth)acrylic polymer, polyolefin, polyester, halogenated polyolefin, halogenated polyester, polymercaptan, as well as copolymers or mixtures thereof.

In preferred embodiments of the invention, the structure is a polyvalent alcohol or a polyvalent amine, and these may be monomers, oligomers or polymers. The structure is more preferably a polyvalent alcohol.

In this regard, the following may be mentioned, by way of example, as polyvalent alcohols which are suitable as structures: alkane dioles such as butanediol, pentanediol, hexanediol, alkylene glycols such as ethylene glycol, propylene glycol and polypropylene glycol, glycerin, 2-(hydroxymethyl)propane-1,3-diol, 1,1,1-tris(hydroxymethyl)ethane, 1,1,1-trimethylolpropane, di(trimethylolpropane), tricyclodecane dimethylol, 2,2,4-trimethyl-1,3-pentanediol, bisphenol A, cyclohexanedimethanol, alkoxylated and/or ethoxylated and/or propoxylated derivatives of neopentyl glycol, tertraethylene glycol cyclohexanedimethanol, hexanediol, 2-(hydroxymethyl)propane-1,3-diol, 1,1,1-tris(hydroxymethyl)ethane, 1,1,1-trimethylolpropane and castor oil, pentaerythritol, sugar, polyvalent derivatives thereof or mixtures thereof.

Any units which are suitable for binding structure and functional group may be used as linkers. The linker for thiol-functionalized compounds is preferably selected from the structures (I) to (XI).

1: Bond to the functional group
2: Bond to the structure

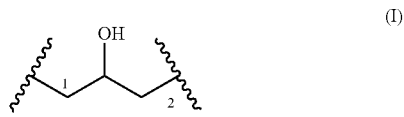

(I)

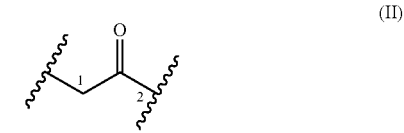

(II)

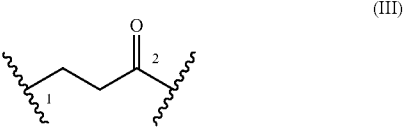

(III)

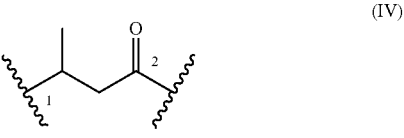

(IV)

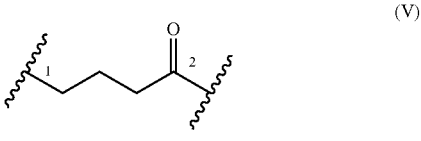

(V)

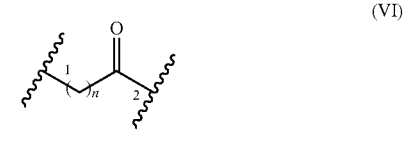

(VI)

$4 <= n <= 10$

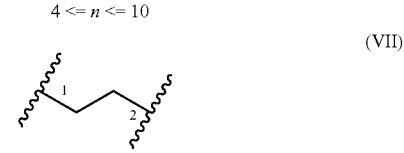

(VII)

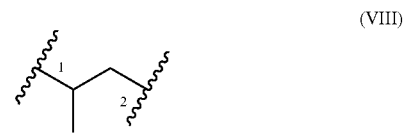

(VIII)

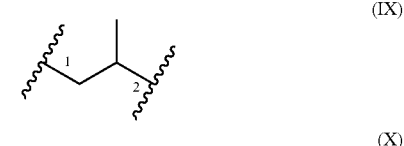

(IX)

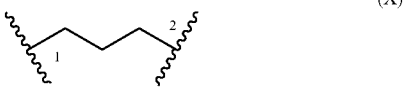

(X)

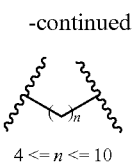

(XI)

$4 <= n <= 10$

The structures (I), (II), (III) and (IV) are particularly preferred as the linkers for thiol-functionalized compounds.

The functional group for the thiol-functionalized compounds is the thiol group (—SH).

Particularly preferred thiol-functionalized compounds are esters of α-thioacetic acid (2-mercaptoacetates), β-thiopropionic acid (3-mercaptopropionates) and 3-thiobutryic acid (3-mercaptobutyrates) having monoalcohols, diols, triols, tetraols, pentaols or other polyols, as well as 2-hydroxy-3-mercaptopropyl derivatives of monoalcohols, diols, triols, tetraols, pentaols or other polyols. Mixtures of alcohols may also be used as a basis for the thiol-functionalized compound. In this respect, reference is made to WO 99/51663 A1, the contents of which are incorporated by reference into this application.

Particularly suitable examples of thiol-functionalized compounds which may be mentioned are: glycol-bis(2-mercaptoacetate), glycol-bis(3-mercaptopropionate), 1,2-propylene glycol-bis(2-mercaptoacetate), 1,2-propylene glycol-bis(3-mercaptopropionate), 1,3-propylene glycol-bis(2-mercaptoacetate), 1,3-propylene glycol-bis(3-mercaptopropionate), tris(hydroxymethyl)methane-tris(2-mercaptoacetate), tris(hydroxymethyl)methane-tris(3-mercaptopropionate), 1,1,1-tris(hydroxymethyl)ethane-tris(2-mercaptoacetate), 1,1,1-tris(hydroxymethyl)ethane-tris(3-mercaptopropionate), 1,1,1-trimethylolpropane-tris(2-mercaptoacetate), ethoxylated 1,1,1-trimethylolpropane-tris(2-mercaptoacetate), propoxylated 1,1,1-trimethylolpropane-tris(2-mercaptoacetate), 1,1,1-trimethylolpropane-tris(3-mercaptopropionate), ethoxylated 1,1,1-trimethylolpropane-tris(3-mercaptopropionate), propoxylated trimethylolpropane-tris(3-mercaptopropionate), 1,1,1-trimethylolpropane-tris(3-mercaptobutyrate), pentaerythritol-tris(2-mercaptoacetate), pentaerythritol-tetrakis(2-mercaptoacetate), pentaerythritol-tris(3-mercaptopropionate), pentaerythritol-tetrakis(3-mercaptopropionate), pentaerythritol-tris(3-mercaptobutyrate), pentaerythritol-tetrakis(3-mercaptobutyrate). Capcure® 3-800 (BASF), GPM-800 (Gabriel Performance Products), Capcure® LOF (BASF), GPM-800LO (Gabriel Performance Products), KarenzMT PE-1 (Showa Denko), 2-ethylhexyl thioglycolate, isooctyl thioglycolate, di(n-butyl)thiodiglycolate, glycol-di-3-mercaptopropionate, 1,6-hexanedithiol, ethylene glycol-bis(2-mercaptoacetate) and tetra(ethylene glycol)dithiol.

The thiol-functionalized compound may be used alone or as a mixture of two or a plurality of different thiol-functionalized compounds.

According to the invention, the weight ratio of the at least one radically polymerizable compound (a) and the at least one thiol-functionalized compound (b) is 10:1 to 2:1, preferably 8:1 to 3:1.

The reaction resin mortar contains 10 to 98 wt %, preferably 30 to 80 wt % of a mixture of the at least one radically polymerizable compound (a) and the at least one thiol-functionalized compound (b) in the above-mentioned weight ratio.

The mass information in wt % used here, unless otherwise indicated, is always based on the total weight of the reaction resin mortar.

The curing of the reaction resin mortar according to the invention takes place by radical polymerization. The polymerization initiators (c) used for this polymerization are compounds which, optionally in a mixture with a catalyst or an activator as the polymerization accelerator (d), are thermally activated and/or thermally released at a temperature above 30° C. such that they then cause the curing of the polymerizable compounds.

The polymerization initiator (c) should have a half-life period $t_{1/2}$ in the range between 1 and 200 minutes, preferably between 1 and 120 minutes, at a temperature of 100° C. in chlorobenzene. The half-life period $t_{1/2}$ is the time in which, at a given temperature, half of the polymerization initiator (c) has decomposed. Information regarding the rate of decomposition of polymerization initiators at different temperatures is available from the manufacturers of the polymerization initiators or may be determined by a person skilled in the art. An alternative way is also an estimation of the half-life period $t_{1/2}$ from literature values for the pre-exponential factor A and the activation energy $E_A$ which are generally also available from the manufacturers of the polymerization initiators, by means of the following formula:

$$t_{\frac{1}{2}} = \frac{\ln 2}{A} \cdot e^{\frac{-E_A}{RT}}$$

Suitable polymerization initiators (c) are peroxides, in particular dialkyl peroxides such as di-tert-butyl peroxide, diacyl peroxides such as dibenzoyl peroxide, hydroperoxides such as tert-butyl hydroperoxide or cumene hydroperoxide, percarbonic acid esters such as butyl perbenzoate, perketals such as 1,1-di-tert-butylperoxy-3,3,5-trimethylcyclohexane, sodium persulfate, potassium persulfate, an optionally organically substituted ammonium persulfate (e.g. tetra-n-butylammonium persulfate) and/or an azo compound such as azobisisobutyronitrile having a half-life period of $t_{1/2}$ in the range between 1 and 200 minutes, preferably 1 to 120 minutes, at a temperature of 100° C. in chlorobenzene. These polymerization initiators (c) may be used alone or as a mixture.

The term half-life period is correspondingly also used here for the catalyzed decomposition of the polymerization initiator (c) in the given mixture.

The polymerization initiators (c) may also be phlegmatized by encapsulation in filler materials (e.g. by microencapsulation) such that they become active or are released only after being heated to a temperature above 30° C. with corresponding softening or reaction of the filler material.

Alternatively, the polymerization initiator (c) can be an ammonium persulfate which is formed from the corresponding raw materials only once it is in-situ. At least one organically substituted ammonium salt and at least one inorganic persulfate are expediently used as raw materials. This results in the organically substituted ammonium persulfate after the mixing thereof.

Suitable organically substituted ammonium salts are: tri or in particular tetra alkyl, aryl or aryl-alkyl ammonium salts, for example a halide, such as for example chloride, acetate, (meth)acrylate and/or hydrogen sulfate. Particularly preferred is the use of tetrabutylammonium chloride, benzyl triethyl ammonium chloride, tetrabutylammonium hydrogen sulfate, tetradecyl dimethyl benzyl ammonium chloride or trimethyl capryl ammonium chloride or of mixtures of these compounds.

Suitable inorganic persulfates are: sodium, potassium, unsubstituted or weakly substituted ammonium persulfate such as mono or dialkyl, aryl and/or aryl-alkyl ammonium persulfate.

These polymerization initiators (c) may be used alone or as a mixture.

According to a further preferred embodiment of the invention, a peroxide, in particular a dialkyl peroxide such as di-tert-butyl peroxide, a diacyl peroxide such as dibenzoyl peroxide, a hydroperoxide such as tert-butyl hydroperoxide or cumene hydroperoxide, a percarbonate acid ester such as butyl perbenzoate, a perketal such as 1,1-di-tert-butylperoxy-3,3,5-trimethylcyclohexane and/or an azo compound such as azobisisobutyronitrile having a half-life period of $t_{1/2}$ of 1 and 200 minutes, preferably 1 to 120 minutes, as defined above [are used] in addition to ammonium persulfate, in order to improve the curing.

The polymerization initiator (c) may be contained in a quantity of 2 to 30 wt %, preferably 2 to 12 wt %, more preferably 5 to 10 wt % in the reaction resin mortar. If a mixture of polymerization initiators is used, then the total quantity of the polymerization initiators is in range mentioned above.

In order to accelerate the polymerization, a polymerization accelerator (d) can also be added to the reaction resin mortar for the decomposition of the polymerization initiator (c). The half-life period thereof is thus shortened such that peroxides can be used which have a half-life period of more than 200 minutes at 100° C. without accelerators.

Suitable polymerization accelerators (d) are in particular amines, preferably a tertiary amine such as dimethylaniline, bis-(hydroxyethyl)-m-toluidine or similar and/or metal compounds such as a cobalt, manganese, copper, iron and/or vanadium compound.

In order to avoid a premature triggering of the polymerization by heat input from the exterior, a catalyst for activating the polymerization initiator can be added to the reaction resin mortar in a second component, in encapsulated form (e.g. microencapsulation) and/or otherwise phlegmatized.

A particular example is the fixing of the polymerization accelerator (d) to a polymer which releases a metal such as cobalt, manganese, copper, iron and/or vanadium which triggers the decomposition of a peroxide polymerization initiator above the limit temperature of at least 30° C. Correspondingly, the desired activation temperature of above 30° C. can be set in a targeted manner by a suitable combination of polymerization initiators (c) and polymerization accelerators (d) or curing accelerators, known to the person skilled in the art, having corresponding inhibitors.

The polymerization accelerator (d) can be contained in a quantity of 0 to 1 wt %, preferably 0.1 to 0.5 wt %, in the reaction resin mortar.

In a preferred embodiment of the invention, the reaction resin mortar according to the invention also contains an organic and/or inorganic aggregate such as fillers and/or additives for influencing various properties of the masses.

As fillers, conventional fillers are used, preferably mineral or mineral-like fillers such as quartz, glass, sand, quartz sand, quartz powder, porcelain, corundum, ceramic, talcum, silicic acid (e.g. pyrogenic silicic acid), silicates, clay, titanium dioxide, chalk, barite, feldspar, basalt, aluminum hydroxide, granite or sandstone, polymer fillers such as duroplasts, hydraulically curable fillers such as gypsum, quicklime or cement (e.g. alumina cement or Portland cement), metals such as aluminum, carbon black, also wood, mineral or organic fibers or the like, or mixtures of two or more thereof, which may be added as powder, in granulated form or in the form of molded bodies. The fillers may be present in any forms, for example as powder or flour or as molded bodies e.g. in cylindrical, ring, spherical, flake, bacillar, arched or crystal form or also in fiber form (fibrillar fillers), and the corresponding elementary particles preferably have a maximum diameter of 10 mm.

Further conceivable additives are thixotropic agents such as optionally organically post-treated pyrogenic silicic acid, bentonite, alkyl and methyl celluloses, castor oil derivatives or the like, softeners such as phthalic acid or sebacic acid esters, stabilizers, antistatic agents, thickeners, flexibilizers, curing catalysts, rheological additives, wetting agents, coloring additives such as colorants or in particular pigments, for example to dye the components differently for improved checking of the mixing thereof or the like or mixtures of two or a plurality thereof.

The inorganic and/or organic aggregates may be contained in the reaction resin mortar in a quantity of up to 60 wt %.

According to a preferred embodiment of the invention, the reaction resin mortar contains 10 to 98 wt % of a mixture of at least one radically polymerizable compound (a) and at least one thiol-functionalized compound (b) in a weight ratio of 10:1 to 2:1, preferably 8:1 to 3:1, 2 to 12 wt % of at least one polymerization initiator (c), 0 to 1 wt % of at least one polymerization accelerator (d), 0 to 60 wt % of at least one inorganic and/or organic aggregate (e) and 0 to 10 wt % of at least one solvent or diluent (f).

According to a further preferred embodiment of the invention, the reaction resin mortar contains 30 to 80 wt % of a mixture of at least one radically polymerizable compound (a) and at least one thiol-functionalized compound (b) in a weight ratio of 10:1 to 2:1, preferably 8:1 to 3:1, 5 to 10 wt % of at least one polymerization initiator (c), 0 to 0.5 wt % of a polymerization accelerator (d), 20 to 60 wt % of at least one inorganic and/or organic aggregate (e) and 0 to 10 wt % of at least one solvent or diluent (f).

The portions of the constituents are selected such that the wt % adds up to 100 respectively.

The reaction resin mortar according to the invention can be formulated in a single or multi-component manner. In the case of the single-component form, the components must be selected such that curing of the reaction resin mortar takes place only after the supply of heat. With respect to improved storability, it is, however, preferred to formulate the reaction resin mortar according to the invention in a multi-component manner, in particular in two components. Similarly, the multi-component form, in particular the two-component form, is preferred for the reaction resin mortar if an organically substituted ammonium persulfate is used as the polymerization initiator. In this regard, one component of the reaction resin mortar contains at least one organically substituted ammonium salt, while another component contains at least one inorganic persulfate, and they form the organically substituted ammonium persulfate in a very quick reaction as soon as the components are mixed with each other, said organically substituted ammonium persulfate then being provided as the initiator for the radical curing of the reaction resin mortar.

A further subject matter of the invention is a method for fixing anchor rods, rebars or the like into bore holes in different mineral subgrades which consists of introducing the reaction resin mortar in accordance with the invention which is described above into the bore hole. Subsequently the anchor rod, rebar or a similar fixing element is introduced into the bore hole coated with the reaction resin mortar, whereupon the frontal polymerization is triggered by heating the reaction resin mortar to a temperature above the reaction temperature of the polymerization initiator and/or of the polymerization accelerator.

The mixing of the components of the reaction resin mortar may take place here e.g. by means of a static mixer when the reaction resin mortar is present in two- or multi-component form. When using an ammonium persulfate as the polymerization initiator, the organically substituted ammonium salt which is contained in a component of the reaction resin mortar is then spontaneously reacted in-situ with the inorganic persulfate which is contained in the at least one further component of the reaction resin mortar to form the corresponding organically substituted ammonium persulfate such that a reaction resin mortar which is radically polymerizable by heat action develops.

In this regard, the polymerization of the reaction resin mortar may be triggered by selective or extensive heating of the surface layer or in the inside of the reaction resin mortar.

While it is possible to trigger the reaction resin mortar by heat input via a heat-conducting fixing element, according to the invention it is preferred to carry out selective or extensive heating of the surface layer of the reaction resin mortar with the aid of a flame, a soldering tip, a hot air fan, a heating wire which extends either over the entire length or a part of the length of the fixing element, a flash of light, a laser beam, an induction oven and/or in-situ with the aid of a chemical reaction.

It is also possible to carry out the thermal initiation of the reaction resin mortar by heat input via a heat-conducting fixing element, whether it is by heat conduction, by resistance heating or with the aid of an e.g. energy field radiated via the fixing element such as an electric, magnetic or electromagnetic field, for example by microwave radiation.

When carrying out the method according to the invention, the dimensions of the bore hole and anchor rod are selected according to the prior art for injection systems. In this regard, a quantity of the reaction resin mortar according to the invention is introduced into the prepared bore hole such that the annular gap is completely filled after the setting of the element to be fixed. According to the invention, adjustment of the element is possible since the reaction resin mortar is cured only after brief heating for a few seconds to at least 80° C.

The reaction resin mortar according to the invention is particularly suited for chemical fixing, in particular for use in plugging applications in hollow bricks with a screen sleeve. It is, in particular, thus possible here to also work with front speeds below the 10 cm/min described in DE 100 02 367 C1.

In this manner, it is possible to carry out complete and especially even curing of the reaction resin mortar without much foaming or smoke development and thus to achieve a compact cured mass which leads to improved properties.

The following examples serve to further explain the invention.

Examples

Measuring the Front Temperature as Well as the Front Speed

The measurement of the front temperature takes place in a test tube with a diameter of 6 mm. Thermoelements are provided at two measuring points at a suitable distance by means of which the change of the temperature can be measured. The reaction resin mortar to be examined is introduced into the test tube at room temperature (23° C.). The polymerization of the reaction resin mortar is triggered by ignition by means of a soldering iron at approximately 200° C. at one point on the mortar surface. The temperature can be determined at the measuring points. The front speed can be calculated from the quotient of the distance between the two measuring points and the time difference between the temperature peaks.

The open time is the time period within which the finished mixed reaction resin mortar can be processed at room temperature. In this regard, no open time can be indicated for mortar masses which do not spontaneously cure.

Measuring the Failure Loads

In order to determine the failure loads of the cured mass, holes with a diameter of 16 mm and a depth of 85 mm are drilled in hollow bricks analogous to EN 791-1, but with a compressive strength of approximately 35 MPa, and Hilti HIT-SC 16*85 screen sleeves (1) are used, as is schematically depicted in the FIGURE, with an insertion end (2) and an open end (3) to fill the screen sleeve (1) with reaction resin mortar and to accommodate the anchor rods, which are lightly wrapped with a resistance wire (resistance value approximately 10 Ohm) (4) according to the FIGURE. After filling the screen sleeves (1) with the reaction resin mortar, threaded anchor rods of the dimension M10 are set and the curing is started by briefly applying a voltage of approx. 12 V via the heating wire (4). The average failure loads are determined by centrically pulling out the threaded anchor rods. Three threaded anchor rods are plugged in, in each case and the load values thereof are determined after two hours of curing.

The failure loads (kN) determined here are given as mean values in Table 1 below.

Examples 1 to 8

Reaction resin mortars are manufactured using the constituents indicated in Table 1 below and the front temperatures and the front speeds are determined for the polymerization as well as the failure loads, as described above.

It is clear from the results that the front temperatures could be in part notably reduced by using the thiol-functionalized compounds, in particular for examples 1 to 8. This leads to reduced foaming and improved curing of the masses. Accordingly, higher failure loads could be achieved with the reaction resin mortars according to the invention than with the reaction resin mortars according to the comparative examples. The results also show that with the compositions according to the invention it is no longer essential for the polymerization front to have to progress at a determined speed in order to achieve sufficient curing of the masses, as in the masses according to DE 100 02 367 C1. It could thus be shown that with the reaction resin mortars according to the invention good curing is no longer dependent on the front speed.

TABLE 1

Compositions of the reaction resin mortar - Results of the temperature measurement of the polymerization front

| | Comparative example 1 | Comparative example 2 | Example 1 | Example 2 | Example 3 | Example 4 | Example 5 | Example 6 | Example 7 | Example 8 |
|---|---|---|---|---|---|---|---|---|---|---|
| TMPTMA[1] | 10 g | | 8.9 g | 8 g | 6.7 g | 16 g | 8.9 g | 13.3 g | | |
| CN 975[2] | 10 g | 20 g | 8.9 g | 8 g | 6.7 g | 2 g | | | 16.5 g | 13.3 |
| TMP(EO)TA[3] | | | | | | | 8.9 g | | | |
| PETMP[4] | | | 2.2 g | 4 g | 6.7 g | 2 g | 2.2 g | | 3.3 g | 6.7 |
| TMPMP[5] | | | | | | | | 6.7 g | | |
| Perkadox 20S[6] | 4 g | | 4 g | 4 g | 4 g | | 4 g | | | |
| TBAPS[7] | | | | | | 1.4 g | | | | |
| Butyl perbenzoate | | | | | | | | 1.5 g | | |
| TMCH[9] | | 1.6 g | | | | | | | 1.6 g | 1.6 g |
| Octa-Soligen Mn[8] | | | | | | | | 0.2 g | | |
| Pyrogenic silicic acid | 1.2 g | 1.2 g | 1.2 g | 1.2 g | 1.2 g | 2 g | 2 g | 1.2 g | 1.2 g | 1.2 g |
| Ene:Thiol | — | — | 8:1 | 4:1 | 2:1 | 9:1 | 8:1 | 2:1 | 5:1 | 2:1 |
| Half-life period $t_{1/2}$ at 100° C. | 23 | 109 | 23 | 23 | 23 | 56 | 23 | 4 | 109 | 109 |
| Temperature [° C.] | 223 | 240 | 185 | 165 | 133 | 112 | 125 | 215 | 210 | 195 |
| Open time [min] | n/a | n/a | n/a | 120 | 60 | n/a | n/a | 8 | 75 | 45 |
| Front speed [cm/min] | 1.3 | 15 | 2 | 1.6 | 1.4 | 11 | 1.7 | 2.9 | 8 | 4 |
| Failure load [kN] M10 * 80 mm | 0.5 | 0.6 | 1.1 | 1.9 | 1.3 | 2.3 | 1.2 | 6.9 | 1.1 | 2.4 |

[1]Trimethylolpropane trimethacrylate
[2]Hexafunctional aromatic urethane acrylate oligomer (Sartomer)
[3]9-fold ethoxylated trimethylolpropane triacrylate
[4]Pentaerythritol tetra (3-mercaptopropionate)
[5]Trimethylolpropane tris(3-rnercaptopropionate)
[6]20% dibenzoyl peroxide on gypsum basis (AkzoNobel Polymer Chemicals)
[7]Tetrabutylammonium peroxodisulfate
[8]10% manganese octanoate (OMG Borchers)
[9]1,1-di-(tert-butylperoxy)-3,3,5-trimethylcyclohexane

The invention claimed is:

1. A reaction resin mortar curable by frontal polymerization, comprising:
   at least one radically polymerizable compound (a);
   at least one thiol-functionalized compound (b), wherein the thiol-functionalized group has at least two thiol groups; and
   at least one polymerization initiator (c),
   wherein the weight ratio of the at least one radically polymerizable compound (a) and the at least one thiol-functionalized compound (b) is in the range of 10:1 to 2:1 and
   wherein the polymerization initiator (c) is selected from the group consisting of compounds which can be thermally released at a temperature of 30° C.; a combination of at least one organically substituted ammonium salt and at least one inorganic persulfate, wherein the at least one organically substituted ammonium salt and the at least one inorganic persulfate form an ammonium persulfate when reacted in situ; and mixtures thereof.

2. The reaction resin mortar according to claim 1, wherein the polymerization initiator (c) is a combination of at least one organically substituted ammonium salt and at least one inorganic persulfate, and
   wherein the at least one organically substituted ammonium salt and the at least one organic persulfate are present separately in a reaction inhibiting manner such that the organically substituted ammonium persulfate is formed only after mixing the at least one organically substituted ammonium salt and the at least one organic persulfate.

3. The reaction resin mortar according to claim 2, wherein the at least one organically substituted ammonium salt is selected from the group consisting of a tri or tetra alkyl, aryl or aryl-alkyl ammonium halide, acetate, (hydrogen)carbonate, (hydrogen)phosphate, (hydrogen)sulfate, (meth)acrylate, and mixtures thereof.

4. The reaction resin mortar according to claim 2, wherein the at least one inorganic persulfate is selected from the group consisting of ammonium, potassium or sodium persulfate, and mixtures thereof.

5. The reaction resin mortar according to claim 1, which also contains a polymerization accelerator (d).

6. The reaction resin mortar according to claim 5, wherein the polymerization accelerator (d) is selected from amines, sulfides, thiourea or mercaptans and/or metal compounds.

7. The reaction resin mortar according to claim 5, wherein the polymerization accelerator (d) is contained in a quantity of 0.01 to 1 wt %.

8. The reaction resin mortar according to claim 1, which also contains inorganic and/or organic aggregates.

9. The reaction resin mortar according to claim 8, wherein the aggregate is selected from fillers and/or additives.

10. The reaction resin mortar according to claim 9, wherein the aggregate is contained in a quantity of up to 60 wt %.

11. The reaction resin mortar according to claim 1, which contains 10 to 98 wt % of a mixture of the at least one radically polymerizable compound (a) and the at least one thiol-functionalized compound (b).

12. The reaction resin mortar according to claim 1, which contains 2 to 30 wt % of the polymerization initiator (c).

13. The reaction resin mortar according to claim 1, which contains, as the polymerization initiator (c), a peroxide and/or an azo compound, which, optionally in the presence of a polymerization accelerator (d), each have a half-life period $t_{1/2}$ in the range between 1 and 200 minutes at a temperature of 100° C. in chlorobenzene.

* * * * *